US011047512B2

(12) United States Patent
Le Corre et al.

(10) Patent No.: US 11,047,512 B2
(45) Date of Patent: Jun. 29, 2021

(54) FLEXIBLE PIPE WITH LAYERS OF METAL ARMOUR AND LAYERS OF COMPOSITE ARMOUR

(71) Applicants: IFP Energies nouvelles, Rueil-Malmaison (FR); TECHNIP FRANCE, Courbevoie (FR)

(72) Inventors: Vincent Le Corre, Saint-Just-Chaleyssin (FR); Michael Martinez, Saint Symphorien d'Ozon (FR); Julien Maurice, Duclair (FR); Alexandre Damiens, Berville-en-Caux (FR); Antoine Felix-Henry, Rouen (FR)

(73) Assignees: IFP Energies nouvelles, Rueil-Malmaison (FR); TECHNIP FRANCE, Courbevoie (FR)

( * ) Notice: Subject to any disclaimer, the term of this patent is extended or adjusted under 35 U.S.C. 154(b) by 104 days.

(21) Appl. No.: 16/498,048

(22) PCT Filed: Mar. 13, 2018

(86) PCT No.: PCT/EP2018/056143
§ 371 (c)(1),
(2) Date: Sep. 26, 2019

(87) PCT Pub. No.: WO2018/177735
PCT Pub. Date: Oct. 4, 2018

(65) Prior Publication Data
US 2020/0103059 A1 Apr. 2, 2020

(30) Foreign Application Priority Data
Mar. 31, 2017 (FR) .................... 17/52.748

(51) Int. Cl.
*F16L 11/08* (2006.01)
*B32B 1/08* (2006.01)
*B32B 5/26* (2006.01)

(52) U.S. Cl.
CPC .............. *F16L 11/083* (2013.01); *B32B 1/08* (2013.01); *B32B 5/26* (2013.01); *B32B 2597/00* (2013.01)

(58) Field of Classification Search
CPC ........ F16L 11/083; F16L 11/088; F16L 11/16; F16L 11/00
(Continued)

(56) References Cited

U.S. PATENT DOCUMENTS 5,269,349 A * 12/1993 Sugier .................. F16L 11/083
138/129
5,275,209 A * 1/1994 Sugier ..................... F16L 11/16
138/129

(Continued)

FOREIGN PATENT DOCUMENTS

EP 1459003 A1 9/2004
WO 2012/006998 A1 1/2012

OTHER PUBLICATIONS

International Search Report for PCT/EP2018/056143, dated May 2, 2018; English translation submitted herewith (6 pgs.).

*Primary Examiner* — Patrick F Brinson
(74) *Attorney, Agent, or Firm* — Fitch, Even, Tabin & Flannery, LLP

(57) ABSTRACT

The present invention relates to a flexible pipe comprising a mechanical reinforcement element (4) and a pressure sheath. Mechanical reinforcement element (4) comprises at least one metallic tensile armour layer (6) and at least one composite tensile armour layer (7). Composite tensile armour layer (7) is arranged outside metallic tensile armour layer (6). Separation means (8) are provided to separate (Continued)

composite tensile armours (7), while maintaining a radial clearance and a circumferential clearance for composite tensile armours (7).

17 Claims, 2 Drawing Sheets

(58) Field of Classification Search
USPC .................... 138/135, 134, 129, 138, 140
See application file for complete search history.

(56) References Cited

U.S. PATENT DOCUMENTS

| | | | | |
|---|---|---|---|---|
| 5,645,109 A * | 7/1997 | Herrero | ................ | F16L 11/082 138/130 |
| 5,934,335 A * | 8/1999 | Hardy | ................ | F16L 11/12 138/131 |
| 6,123,114 A * | 9/2000 | Seguin | ................ | F16L 11/083 138/124 |
| 6,843,278 B2 * | 1/2005 | Espinasse | ................ | F16L 11/16 138/127 |
| 7,124,780 B2 * | 10/2006 | Dupoiron | ................ | F16L 11/16 138/134 |
| 8,353,316 B2 * | 1/2013 | Do | ................ | F16L 11/083 138/134 |
| 8,967,205 B2 * | 3/2015 | Kalman | ................ | F16L 11/083 138/134 |
| 9,587,773 B2 * | 3/2017 | Nokkentved | ................ | G01M 3/38 |
| 2005/0039811 A1 | 2/2005 | Averbuch et al. | | |
| 2005/0115623 A1 * | 6/2005 | Coutarel | ................ | F16L 11/083 138/135 |
| 2013/0112308 A1 | 5/2013 | Glejbol | | |
| 2014/0305532 A1 * | 10/2014 | Glejbol | ................ | F16L 11/16 138/129 |
| 2015/0027580 A1 | 1/2015 | Glejbol | | |

* cited by examiner

FLEXIBLE PIPE WITH LAYERS OF METAL ARMOUR AND LAYERS OF COMPOSITE ARMOUR

CROSS-REFERENCE TO RELATED APPLICATIONS

This application is a U.S. national phase application filed under 35 U.S.C. § 371 of International Application No. PCT/EP2018/056143, filed Mar. 13, 2018, designating the United States, which claims priority from French Patent Application No. 17/52.748, filed Mar. 31, 2017, which are hereby incorporated herein by reference in their entirety.

FIELD OF THE INVENTION

The present invention relates to a flexible tubular pipe for petroleum fluid transport used in the field of offshore oil exploitation.

The flexible pipes addressed by the present invention consist of an assembly of different concentric and superposed layers, referred to as unbonded because these layers have a certain freedom to move relative to one another during a bending stress undergone by the flexible pipes. These flexible pipes meet, among other things, the recommendations of the normative documents API 17J "Specification for Unbonded Flexible Pipe" (4$^{th}$ Edition, May 2014) and API 17B "Recommended Practice for Flexible Pipe" (5$^{th}$ Edition, May 2014) published by the American Petroleum Institute, as well as the normative document DNV-OS-C501 "Composite Components" (November 2013) published by Det Norske Veritas. The constituent layers of the flexible pipes notably comprise polymer sheaths generally providing a sealing function, and reinforcement layers designed to take up the mechanical stresses, made up of winding strips, metal wires, various tapes or profiles made from composite materials.

These flexible pipes are notably used for transporting oil or gas type hydrocarbons from a subsea equipment located on the seabed, a wellhead for example, to a floating production unit located at the surface. Such pipes can be deployed at great depths, commonly more than 2000 m, and they must therefore be able to withstand a hydrostatic pressure of several hundred bars. Furthermore, they must also withstand the very high pressure of the hydrocarbons transported, and this pressure can also reach several hundred bars.

When the flexible pipe is in service, it can be subjected to high static and dynamic loads, which may generate a fatigue phenomenon. The most severe loads are generally observed in the upper part of the riser pipes connecting the seabed to the surface. Indeed, in this area, the flexible pipe undergoes a high static tensile stress related to the weight of the pipe, coupled with dynamic tensile and transverse bending stresses related to the motion of the floating production unit under the effect of the swell and the waves. Regarding the part of the flexible pipe extending on the seabed (flowline), the loads applied are essentially static.

The most commonly used unbonded flexible pipes in the offshore petroleum industry generally comprise, from inside to outside, an inner carcass consisting of a strip made from stainless steel profiles and helically wound with a short pitch as coils stapled to one another, the purpose of said inner carcass being mainly to prevent collapse of the flexible pipe under the effect of the external pressure, an inner polymer sealing sheath, a pressure vault consisting of at least one clipped metal wire helically wound with a short pitch, said pressure vault being intended to take up the radial stresses related to the internal pressure, tensile armour layers consisting of long-pitch helical windings of metal or composite wires, said tensile armour layers being intended to take up the longitudinal stresses undergone by the flexible pipe, and finally an outer sealing sheath intended to protect the reinforcement layers from the sea water. In the present application, short-pitch winding refers to any coil having a helix angle whose absolute value is close to 90 degrees, in practice ranging between 70 degrees and 90 degrees to the longitudinal axis of the flexible pipe. The term long-pitch winding refers to any coil whose helix angle is, in absolute value, less than or equal to 55 degrees to the longitudinal axis of the flexible pipe.

The inner carcass provides sufficient collapse strength for the flexible pipe to be able to withstand high external pressures, notably the hydrostatic pressure when the flexible pipe is submerged at great depth (1000 m, or 2000 m, or even more), or the external contact pressures undergone during handling and installation at sea. A flexible pipe comprising an inner carcass is referred to as of rough bore type because the innermost element is the inner carcass that provides a rough passage due to the intervals between the metallic coils of the stapled strip.

The main purpose of the pressure vault is to enable the inner sealing sheath to withstand without bursting the pressure exerted by the petroleum fluid transported in the pipe, the outer face of the inner sealing sheath resting against the inner face of the pressure vault. The pressure vault also contributes to improving the collapse strength of the inner carcass, notably because it limits the possibilities of deformation of the inner carcass under the effect of the hydrostatic pressure.

The main purpose of the tensile armour layers is to take up longitudinal stresses, notably those related to the suspended weight of the flexible pipe when it is installed on the seabed from a pipe-laying vessel at the surface. In the case of a riser pipe permanently connecting an installation resting on the seabed to a surface floating equipment, these longitudinal stresses related to the suspended weight are exerted permanently. When the pipe is submerged at great depth, the longitudinal stresses related to the suspended weight during installation and/or service can reach several hundred tons.

The tensile armour layers are generally made of metal or a composite material. The metallic tensile armours conventionally used for axial reinforcement of the flexible pipes pose a weight problem at great depth. Indeed, according to the intended application, there is a depth beyond which the increase in the section of the steel armours increases the own weight of the line more than it increases the axial strength. The loading at the top of the riser during production or of the flowline during installation then exceeds the capacity thereof. Installing the line then becomes impossible since the suspended weight is greater than the capacity limit of taking up the stresses of the laying equipments.

Work has been carried out for several years now to replace these metal profiles with composite material profiles, which afford the advantage of having a much lower density, and therefore mass, than metals. On the other hand, composite tensile armours have a lower compressive strength than metal tensile armours, which poses a problem for loadings at the sea bottom dominated by the external pressure.

BACKGROUND OF THE INVENTION

In order to limit the mass of the tensile armour layers and, a fortiori, the mass of the flexible pipe, patent application WO-2012/006,998 describes the design of an element intended for mechanical reinforcement of a flexible pipe, comprising at least two tensile armour layers made of a first material (metal for example), at least two tensile armour layers made of a second material (composite for example) and a layer separating the armour layers made of a different material. However, the tensile armour layers being made of different materials, the tensile armours may be subjected to heavy compression forces, which is not compatible with composite tensile armours.

Patent application EP-1,459,003 describes the insertion of an intermediate element between the tensile armours so as to limit the transverse displacement of the armours and thus to limit buckling of the tensile armours. This solution is not completely satisfactory, notably in terms of mass of the flexible pipe.

To overcome these drawbacks, the present invention relates to a flexible pipe comprising a mechanical reinforcement element and a pressure sheath. The mechanical reinforcement element comprises at least one metallic tensile armour layer and at least one composite tensile armour layer. The composite tensile armour layer is arranged outside the metallic tensile armour layer. Furthermore, separation means are provided to separate the composite tensile armours while maintaining a radial clearance and a circumferential clearance for the composite tensile armours. These clearances allow the composite tensile armours to move radially under the axial compression load of the flexible pipe. Thus, the composite tensile armour layer is free to extend radially so as to make up for the axial reduction of the pipe under the effect of the external pressure. The axial compressive stresses are therefore minimized in the composite tensile armours. Besides, the composite tensile armour layer contributes to the taking up of the axial tensile stresses. Thus, the metallic tensile armour layers are used for taking up the compressive forces at the bottom, dominated by the high pressures, and the composite tensile armour layers are used for complementing the taking up of the tensile forces at the top of the pipe.

SUMMARY OF THE INVENTION

The present invention relates to a flexible pipe for petroleum fluid transport, said pipe comprising at least one mechanical reinforcement element and a pressure sheath, said mechanical reinforcement element being arranged outside said pressure sheath, said mechanical reinforcement element comprising at least one metallic tensile armour layer and at least one composite tensile armour layer, said composite tensile armour layer being arranged outside said metallic tensile armour layer. Separation means separate said composite tensile armours, said separation means providing a radial clearance and a circumferential clearance for said composite tensile armours.

According to an embodiment of the invention, said radial clearance $J_r$ of said composite tensile armours is determined as a function of an equation of the type:

$$J_r \geq a_c \cdot \left( \sqrt{1 - \frac{1-\left(1+\frac{\Delta L}{L_0}\right)^2}{\tan^2\alpha_c}} - 1 \right),$$

with $a_c$ the mean radius of said composite tensile armour, $$\frac{\Delta L}{L_0}$$

the contraction ratio of said pipe under the load of the external pressure, and $\alpha_c$ the armouring lay angle of said composite tensile armours.

Advantageously, the lay angle of said composite tensile armour layer is less than or equal to 25 degrees, preferably ranging between 10 and 25 degrees.

Preferably, the lay angle of said metallic tensile armour layer ranges between 25 and 55 degrees, more preferably between 30 and 55 degrees.

According to an embodiment option, said composite tensile armours are dimensioned for sharing the axial loads among said metallic and composite armour layers.

According to an implementation of the invention, the number of composite tensile armours making up said composite tensile armour layer is constrained by the section, the lay angle and the material of said composite tensile armours, and by the number, the section, the lay angle and the material of said metallic tensile armours.

According to a characteristic, the number $n_c$ of composite tensile armours making up said composite tensile armour layer is defined by a formula of the type:

$$n_c > \frac{1}{S_c} \cdot \frac{1}{E_c \cdot \cos^2\alpha_c} \cdot \max \left\{ F_{TOT} \cdot \frac{E_a \cdot \cos^2\alpha_a}{sf_a \cdot \sigma_a^Y} - K_a; F_{TOT} \cdot \frac{E_c \cdot \cos^2\alpha_c}{sf_c \cdot \sigma_c^Y - H_c \frac{n_c}{a_c} \sin^2\alpha_c} - K_a \right\},$$

with $K_i = E_i \cdot n_i \cdot S_i \cdot \cos^3\alpha_i$, i being the subscript associated with the tensile armour layer considered: i corresponding to a for metallic or c for composite, $E_i$ the Young's modulus of material i, $S_i$ the section of the tensile armour of material i, $\alpha_i$ the armouring lay angle of the tensile armour of material i, $F_{TOT}$ the total axial force undergone by the pipe, $sf_i$ a safety factor for the tensile armour layer of material i, $\sigma_i^Y$ the tensile strength of material i, $h_c$ the maximum distance to the neutral axis of the composite tensile armour, and $a_c$ the mean positioning radius of said composite tensile armour.

According to an embodiment, said composite material is designed to impart to said composite tensile armour layers an ultimate elongation at least equal to the ultimate elongation of said metallic tensile armour layers.

Advantageously, said composite material is a unidirectional fibre composite material.

According to an implementation of the invention, the longitudinal Young's modulus of said composite material is less than the longitudinal Young's modulus of said metallic material.

Advantageously, said circumferential clearance between a composite tensile armour and a separation means ranges between 0.5 and 3 mm.

According to an embodiment option, said separation means are made of a polymer material.

According to an embodiment, said separation means consist of strips of substantially rectangular section, said strips of said separation means being arranged between said composite tensile armours.

Alternatively, said separation means consist of strips of substantially U-shaped section, said strips of said separation means being wound around said metallic tensile armour layer, and a composite tensile armour being arranged within said U of each separation means.

Advantageously, said composite tensile armours have a substantially circular section.

Preferably, said metallic tensile armours have a substantially rectangular section.

According to a characteristic, the mechanical reinforcement element comprises an even number of metallic armour layers and an even number of composite armour layers.

BRIEF DESCRIPTION OF THE FIGURES

Other features and advantages of the device according to the invention will be clear from reading the description hereafter of embodiments given by way of non limitative example, with reference to the accompanying figures wherein.

Figure 1:
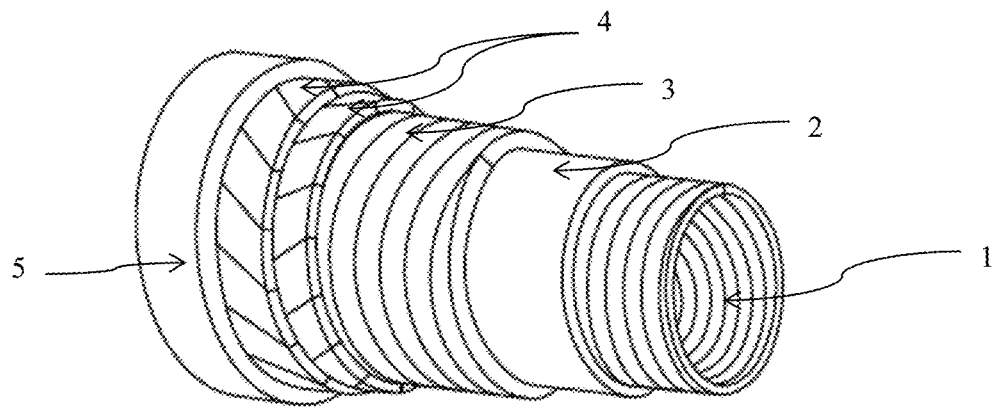
FIG. 1 schematically illustrates, in perspective view, a flexible pipe according to the prior art.

A flexible pipe according to the prior art is shown in FIG. 1. This pipe consists of several layers described hereafter, from the inside to the outside of the pipe. The flexible pipe is of unbonded type and it meets the specifications defined in the normative document API 17J.

Inner carcass 1 consists of a metal strip helically wound with a short pitch. It is intended for collapse strength under the effect of the external pressure applied on the pipe.

Inner sealing sheath 2 is made by extrusion of a polymer material generally selected from among polyolefins, polyamides and fluoropolymers.

Pressure vault 3 made of stapled or interlocked metal wires provides internal pressure strength in the pipe.

According to the illustration of FIG. 1, tensile armour layers 4 consist of metal wires helically wound at angles whose absolute value with respect to the longitudinal axis of the flexible pipe ranges between 20 degrees and 55 degrees. The pipe advantageously comprises two superposed and crossed layers of tensile armours 4, as shown in FIG. 1. For example, if the inner tensile armour layer is wound with a helix angle of 30 degrees, the outer tensile armour layer is wound with a helix angle of −30 degrees. This angular symmetry allows to provide torsional balance to the pipe, so as to reduce the tendency thereof to rotate under the effect of a tensile force.

When the two superposed and crossed tensile armour layers 4 are wound with a helix angle substantially equal to 55 degrees, pressure vault 3 may optionally be removed because the 55-degree helix angle imparts good internal pressure strength to tensile armour layers 4.

Outer sealing polymer sheath 5 provides an external protection to the pipe.

The pipe shown in FIG. 1 is of rough bore type, i.e. the fluid circulating in the pipe is in contact with inner carcass 1.

Alternatively, the pipe can be of smooth bore type. In this case, the pipe shown in FIG. 1 comprises no inner carcass 1. Polymer sheath 2 is directly in contact with the fluid circulating in the pipe. Polymer sheath 5 is sealed. The external pressure forces are supported by vault 3.

DETAILED DESCRIPTION OF THE INVENTION

The flexible pipe according to the invention comprises at least one pressure sheath and at least one mechanical reinforcement element. In the present application, the term "mechanical reinforcement element" designates all the armour layers (metallic and composite) used to take up the longitudinal stresses of the flexible pipe. Furthermore, the flexible pipe according to the invention can advantageously comprise at least one of the other layers of the flexible pipe described in connection with FIG. 1, notably an inner carcass, an outer sealing sheath, a pressure vault and/or other additional layers. Preferably, the flexible pipe according to the invention is of unbonded type and it meets the specifications defined in the normative document API 17J.

According to the invention, the mechanical reinforcement element comprises at least one metallic tensile armour layer and at least one composite tensile armour layer. Within each tensile armour layer, the tensile armours (generally in form of wires or strips) are helically wound around the layer located underneath. The composite armour layer is arranged outside the metallic armour layer. Thus, the composite tensile armour layer contributes to taking up the axial tensile stresses: the axial stresses are distributed among the metallic tensile armour layer and the composite tensile armour layer. For example, the metallic tensile armour layer is used for taking up the compressive forces at the bottom, dominated by the high pressures, and the composite tensile armour layer is used for complementing the taking up of the tensile forces at the top of the pipe.

The design of a flexible pipe comprising both metallic tensile armours and composite tensile armours allows to reduce the section and/or the number of metallic tensile armour layers. The composite materials being lighter than the metallic layers, the mass of the flexible pipe is decreased in relation to a design comprising metallic tensile armours only.

Besides, according to the invention, separation means separate the composite tensile armours while maintaining a radial clearance and a circumferential clearance. In the present application, the expression "radial clearance" designates the possible motion of the composite tensile armour in a direction merged with the radius of the flexible pipe, and the radial clearance is directed outwardly to the pipe. In other words, the composite tensile armours can move away from the centre of the flexible pipe. In the present application, the expression "circumferential clearance" designates the possible motion of the composite tensile armour in a peripheral direction. In other words, the composite tensile armours can move along a circular arc whose centre is the axis of the flexible pipe.

The clearances are allowed by the shape and by the layout of the separation means. In particular, the radial clearance is allowed by the height of the separation means, which is greater than the height of the composite tensile armours. The circumferential clearance can be allowed by the fact that the separation means do not occupy all of the circumferential space between two consecutive composite tensile armours. These clearances allow the composite tensile armours to move radially under the axial compression load of the flexible pipe. Thus, the composite tensile armour layer is free to extend radially so as to make up for the axial reduction of the pipe under the effect of the external pressure. The axial compressive stresses are therefore minimized in the composite tensile armours, and the composite tensile armours can thus be used under high pressure conditions.

Advantageously, the radial clearance can be greater than the circumferential clearance so as to allow the composite tensile armours to move essentially radially.

In the present application, the terms "composite tensile armours" and "composite armours" have the same meaning and they are used indiscriminately. Similarly, the terms "metallic tensile armours" and "metallic armours" have the same meaning and they are used indiscriminately.

According to an embodiment of the invention, circumferential clearances can be provided between the metallic armours so as to obtain good bending flexibility.

On the other hand, in order to maintain the internal and external pressure strength, no radial clearance is provided for the metallic armours. For example, the metallic armours can be laid under tension, and a support strip of high mechanical strength reinforced with aramid fibres can maintain them radially. For example, the aramid fibres are selected from among the commercial references Kevlark®, Twaron® or Technora®.

Preferably, the mechanical reinforcement element comprises an even number of metallic tensile armour layers and an even number of composite tensile armour layers. Advantageously, the tensile armour layers of a pair of layers are crossed, in other words they are arranged with lay angles (i.e. the helical winding angle of the tensile armours) of opposite signs. For example, if the inner tensile armour layer is laid with a lay angle (helix angle) of 30 degrees, the outer tensile armour layer is wound with a lay angle (helix angle) of −30 degrees. This angular symmetry allows to provide torsional balance to the pipe, so as to reduce the tendency thereof to rotate under the effect of a tensile force.

For example, the mechanical reinforcement element can comprise, from inside to outside, two metallic tensile armour layers and two composite tensile armour layers. This design provides a good compromise between the mass of the flexible pipe and the internal and external pressure strength.

Upon manufacture of the flexible pipe, helically laying the composite tensile armours may generate an elastic bending stress. Indeed, the larger the lay angle (i.e. the helical winding angle of the tensile armours), the greater the curvature of the helix and the higher this laying stress. In order to limit the assembly stress, it is therefore interesting to use small lay angles for the composite armour layers in relation to the angles commonly used for the metallic armour layers. The lay angles of the composite armour layers are therefore preferably less than or equal to 25 degrees, preferably ranging between 10 and 25 degrees, so as to limit the elastic bending stress within the composite tensile armours.

The lay angles for the metallic armour layers of the flexible pipe according to an implementation of the invention conventionally range between 25 and 55 degrees, preferably between 30 and 55 degrees.

The metallic tensile armours can notably be made of steel, for example stainless steel, austenitic-ferritic steel (or "duplex" steel), or for example from low-alloy carbon steels. The metallic tensile armours can also be cold-formed profiles.

In a variant, the metallic tensile armours are made from titanium or from a titanium alloy.

The composite tensile armours can be made from a fibre-reinforced thermoplastic or thermosetting resin.

For example, the thermoplastic resin is based on a polyolefin such as polyethylene, a polyamide such as PA11 or PA12, a fluoropolymer such as polyvinylidene fluoride (PVDF) or perfluoroalkoxy (PFA). In a variant, the resin is based on a high-performance polymer such as PEK (polyetherketone), PEEK (polyetheretherketone), PEEKK (polyetheretherketoneketone), PEKK (polyetherketoneketone), PEKEKK (polyether-ketoneetherketoneketone), PAI (polyamide-imide), PEI (polyether-imide), PSU (polysulfone), PPSU (polyphenylsulfone), PES (polyethersulfone), PAS (polyarylsulfone), PPE (polyphenyleneether), PPS (polyphenylene sulfide), LCP (liquid crystal polymers), PPA (polyphthalamide) and/or mixtures thereof or in admixture with PTFE (polytetrafluoroethylene) or PFPE (perfluoropolyether).

For example, the thermosetting resin is based on an epoxide resin (EP), a polyester resin (UP), a vinylester resin (VE), a polyurethane resin (PUR) or a phenolic resin (PF).

The reinforcement fibres can be selected from among mineral fibres or synthetic fibres. Preferably, the fibres used are glass fibres and/or carbon fibres. In a variant, the reinforcement fibres are synthetic fibres such as polyethylene, polyester or polyamide fibres, or mineral fibres such as basalt fibres.

For example, the armours can be made from a unidirectional fibre-reinforced composite material, obtained for example by pultrusion, comprising substantially 60% carbon fibres in an epoxide resin. The composite tensile armours can for example be made with T700 carbon fibres marketed by Toray Carbon Fibers, USA. Other carbon fibres such as the TR50 fibres marketed by Mitsubishi Rayon Co., the UTS50 fibres marketed by Teijin or the AS4 fibres marketed by Hexcel can also be used.

In another variant embodiment of the invention, the composite armours are "rope" type armours obtained by braiding several fibre strands, and the fibres are not embedded in a thermoplastic or thermosetting resin. The fibres used for this type of armour are for example selected from among synthetic fibres, such as polyethylene, polyester, carbon or polyamide fibres, or mineral fibres such as basalt fibres. The strands are made from fibres of same nature or from a mixture of different fibres.

Advantageously, using "rope" type armours allows to obtain good mechanical compressive strength properties as the fibres undergo no stress due to the presence of a thermoplastic or thermosetting resin.

The separation means can be made from a polymer material, for example a thermoplastic polymer such as a polyolefin (PE, PP), a polyamide (PA11, PA12) or a fluoropolymer (PVDF, PFA), a thermosetting polymer such as a polyurethane or elastomer. Thus, the separation means are made from a light material (lighter than the tensile armours), which limits the increase in mass of the flexible pipe.

According to an embodiment example of the invention, the metallic tensile armours can have a substantially rectangular section. The section of a tensile armour is designated as an orthogonal sectional view to the direction of the length of the tensile armour. It is thus possible to use the conventionally used armours.

Alternatively, the section of the metallic tensile armours can have any shape, for example circular, elliptic, etc.

According to a first embodiment of the invention, the separation means can be made up of strips of substantially rectangular section. For this embodiment, the strips are arranged between the composite tensile armours. In other words, the composite tensile armour layer consists of an alternation of composite tensile armours and of separation means. This embodiment is simple to implement. The height of the separation means section can be greater than the height of the composite tensile armours, so as to provide the radial clearance. Furthermore, the thickness of the separation means is less than the circumferential distance between two consecutive composite tensile armours, so as to provide the circumferential clearance.

According to a second embodiment of the invention, the separation means can be made up of strips of substantially U-shaped section, the U being open towards the outside of the flexible pipe. For this embodiment, the strips of the separation means can be wound around the metallic tensile armour layer, and a composite tensile armour is arranged within each U of the separation means. In other words, the composite tensile armour layer consists of a series of U-shaped separation means within which composite tensile armours are arranged. This embodiment is notably suitable when the contact pressures between the tensile armour layers are high. Indeed, the U shape provides better distribution of the contact force and it therefore allows the contact pressure to be reduced. The height of the branches of the U can provide the radial clearance, and the space between the branches of the U can provide the circumferential clearance.

According to an implementation of the invention, the circumferential clearance between a composite armour and a separation means ranges between 0.5 and 3 mm. Advantageously, the circumferential clearance can be approximately 1 mm. Thus, the composite tensile armour can have a total circumferential displacement of 2 mm (1 mm in each circumferential direction).

According to an embodiment of the invention, an intermediate layer can be provided between the steel and composite layers. The purpose of this intermediate layer is to block the swelling of the metallic armour under compression. According to an embodiment example, the intermediate layer is a support strip of high mechanical strength reinforced with aramid fibres that can maintain them. For example, the aramid fibres are selected from among the commercial references Kevlar®, Twaron® or Technora®.

Advantageously, anti-wear strips can be provided between the metallic armours in order to prevent wear of the metallic armours.

According to a characteristic of the invention, support tapes can be provided between each pair of layers.

According to an embodiment of the invention, the metallic tensile armour layers are dimensioned to withstand the loadings at the base of the flexible pipe (external pressure, bending) with conventional methods. The tension at the top of the flexible pipe can then be estimated from the own weight of the flexible pipe by disregarding the mass of the composite layers—a posteriori checked assumption—and from the end load in case of internal pressurization. It is assumed that the metallic tensile armour layers thus dimensioned are not of sufficient capacity to take up all of this tension denoted by $F_{TOT}$.

In a simplified design approach, the composite armour layers can be dimensioned in pairs, referred to as bilayers, with opposite armouring lay angles, and positioned at a mean radius $a_c$ deduced from the radius of the metallic tensile armour layers.

Calculation of the total section of the necessary composite armours is based on the principle of a distribution of the axial loads among the armour layers. Forces $F_a$ and $F_c$ in the metallic and composite bilayers are proportional to the respective axial stiffnesses thereof, $K_a$ and $K_c$, according to the overall elongation $$\frac{\Delta L}{L_0}$$

of the pipe:

$$\frac{\Delta L}{L_0} = \frac{F_{TOT}}{K_a + K_c} = \frac{F_c}{K_c} = \frac{F_a}{K_a} \qquad \text{Eq. 1}$$

The axial stiffnesses depend on the geometry of the bilayer and on the Young's modulus of the material:

$$K_i = E_i \cdot n_i \cdot S_i \cdot \cos^3 \alpha_i \qquad \text{Eq. 2}$$

with:
i the subscript associated with the bilayer (i=a for metal, i=c for composite),
E the longitudinal Young's modulus of the material,
n the number of armour wires,
S the section of an armour wire,
$\alpha_i$ the lay angle.

The axial loads in each bilayer are a function of the tensile stress $\sigma_i^t$ in each armour wire and of the bilayer geometry:

$$F_i = \sigma_i^t \cdot n_i \cdot S_i \cdot \cos(\alpha_i) \qquad \text{Eq. 3}$$

By injecting Equations 2 and 3 into Equation 1 for each bilayer, we obtain a relation between the stress in the wires and the stiffness of the composite armour bilayer.

$$\frac{F_{TOT}}{K_a + K_c} = \frac{\sigma_a^t}{E_a \cdot \cos^2 \alpha_a} = \frac{\sigma_c^t}{E_c \cdot \cos^2 \alpha_c} \qquad \text{Eq. 4}$$

The stresses in the wires must meet a material resistance criterion. In the steel wires, tensile stress $\sigma_a^t$ must remain below the elastic limit $\sigma_a^Y$ of the metal weighted by a safety factor $sf_a$ strictly less than 1:

$$\sigma_a^t < sf_a \cdot \sigma_a^Y \qquad \text{Eq. 5}$$

In the composite tensile armours, the sum of tensile stress $\sigma_c^t$ and of bending stress $\sigma_c^b$ upon laying must remain below the tensile breaking strength $\sigma_c^Y$ of the composite weighted by a safety factor $sf_c$ strictly less than 1:

$$\sigma_c^t + \sigma_c^b < sf_c \cdot \sigma_c^Y \qquad \text{Eq. 6}$$

where $$\sigma_c^b = E_c \cdot \frac{h_c}{a_c} \sin^2 \alpha_c \qquad \text{Eq. 7}$$

with:
$a_c$ the mean radius of the composite armour bilayer,
$h_c$ the maximum distance to the neutral axis of the composite tensile armour (equal to radius $r_c$ of the composite tensile armour in the case of a composite tensile armour of circular section).

The stress in the armour wires is extracted from Expression 4, then injected into the material criteria expressed in Equations 5 and 6. For the metallic armour wires:

$$\frac{F_{TOT}}{K_a + K_c} E_a \cdot \cos^2 \alpha_a < sf_a \cdot \sigma_a^Y \qquad \text{Eq. 8}$$

For the composite armours:

$$\frac{F_{TOT}}{K_a + K_c} E_c \cdot \cos^2\alpha_c + \sigma_c^b < sf_c \cdot \sigma_c^Y \qquad \text{Eq. 9}$$

We thus obtain a minimum value to be respected for the stiffness of the composite armour bilayer:

$$K_c > \max\left\{F_{TOT} \cdot \frac{E_a \cdot \cos^2\alpha_a}{sf_a \cdot \sigma_a^Y} - K_a; F_{TOT} \cdot \frac{E_c \cdot \cos^2\alpha_c}{sf_c \cdot \sigma_c^Y - \sigma_c^b} - K_a\right\} \qquad \text{Eq. 10}$$

According to an embodiment of the invention, for a selected armouring lay angle $\alpha_c$ (preferably in the range given above, i.e. less than or equal to 25 degrees) and a given composite material, the optimal number of composite armours $n_c$ to be used in the composite armour bilayer is deduced therefrom as a function of section $S_c$ of an armour:

$$n_c > \frac{1}{S_c} \cdot \frac{1}{E_c \cdot \cos^3\alpha_c} \cdot \qquad \text{Eq. 11}$$

$$\max\left\{F_{TOT} \cdot \frac{E_a \cdot \cos^2\alpha_a}{sf_a \cdot \sigma_a^Y} - K_a; F_{TOT} \cdot \frac{E_c \cdot \cos^2\alpha_c}{sf_c \cdot \sigma_c^Y - E_c \cdot \frac{h_c}{a_c}\sin^2\alpha_c} - K_a\right\}$$

For different composite tensile armour sections available, we can check that the number of tensile armours is compatible with the space left available on the perimeter of the layer after setting an identical number of separation means and providing a predetermined circumferential clearance (a circumferential clearance of approximately 1 mm for example) between the separation means and the composite tensile armours. There are potentially several solution pairs $(n_c, S_c)$. Ideally, wide separation means are desired to provide good stability of the assembly.

Compression in the composite armour layers can be avoided by allowing the composite armours to maintain a constant length. Axial contraction is compensated by a radial displacement enabled by a radial clearance above the composite armours, maintained by the separation means. Knowing the axial stiffness under compression of the flexible pipe, imparted by the steel layers, it is possible to estimate the axial contraction ratio $$\frac{\Delta L}{L_0}$$

of the pipe under the load of the external pressure. The radial displacement $\Delta a$ is estimated geometrically by conservation of the composite armour length on a helix pitch:

$$\Delta a = a_c \cdot \left(\sqrt{1 - \frac{1 - \left(1 + \frac{\Delta L}{L_0}\right)^2}{\tan^2\alpha_c}} - 1\right) \qquad \text{Eq. 12}$$

with $a_c$ the mean radius of said composite tensile armour, $$\frac{\Delta L_z}{L_0}$$

the contraction ratio of said pipe under the load of the external pressure, and $\alpha_c$ the lay angle of said composite tensile armours.

Thus, the radial clearance $J_r$ and a fortiori the height of the separation means can be determined by means of an equation of the type:

$$J_r \geq \Delta a$$

Therefore, $$J_r \geq a_c \cdot \left(\sqrt{1 - \frac{1 - \left(1 + \frac{\Delta L}{L_0}\right)^2}{\tan^2\alpha_c}} - 1\right)$$

with $a_c$ the mean radius of said composite tensile armour, $$\frac{\Delta L}{L_0}$$

the contraction ratio or said pipe under the load of the external pressure, and $\alpha_c$ the lay angle of said composite tensile armours.

It is also desirable that the composite material selected imparts to the composite armour layers an ultimate elongation at least equal to the ultimate elongation of the metallic armour layers. From the previous equations, this criterion of the ultimate elongation of the layers is written as follows:

$$sf_c \cdot \frac{\sigma_c^Y}{E_c} \cdot \frac{1}{\cos(\alpha_c)^2} - \frac{r_c}{a_c} \cdot \tan(\alpha_c)^2 \geq sf_a \cdot \frac{\sigma_a^Y}{E_a} \cdot \frac{1}{\cos(\alpha_a)^2} \qquad \text{Eq. 13}$$

An optimal ultimate elongation is deduced therefrom for the composite material:

$$\left.\frac{\sigma_c^Y}{E_c}\right|_{optim} = \frac{\cos(\alpha_c)^2}{sf_c}\left[sf_a \cdot \frac{\sigma_a^Y}{E_a} \cdot \frac{1}{\cos(\alpha_a)^2} + \frac{r_c}{a_c} \cdot \tan(\alpha_c)^2\right] \qquad \text{Eq. 14}$$

According to an embodiment of the invention, the composite material of the composite armours can be selected so as to verify a selection criterion relating to the ultimate elongation thereof, which must ideally be equal to the optimal elongation:

$$\left.\frac{\sigma_c^Y}{E_c}\right|_{optim} \leq \frac{\sigma_c^Y}{E_c} \qquad \text{Eq. 15}$$

Figure 2:
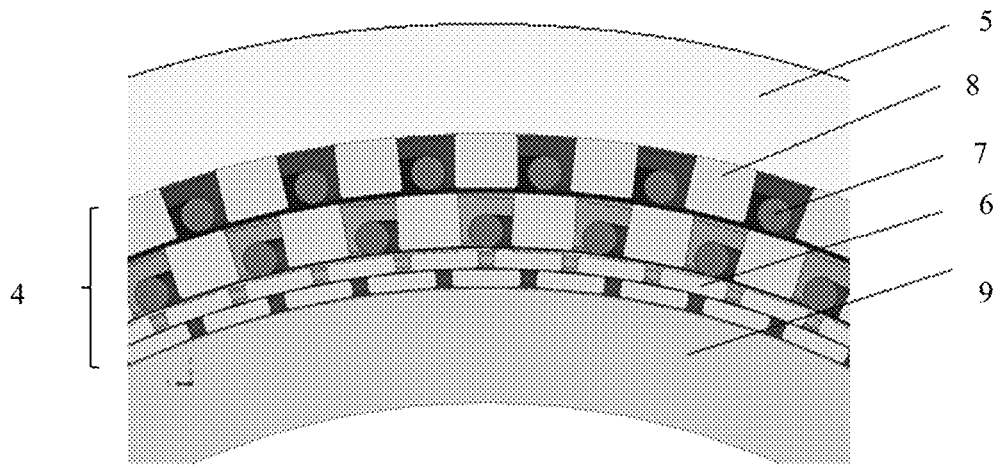
FIG. 2 illustrates a flexible pipe according to a first embodiment of the invention.

FIG. 2 schematically shows, by way of non-limitative example, a flexible pipe according to the first embodiment of the invention. FIG. 2 is a partial cross-sectional view of a flexible pipe. The flexible pipe comprises, from the centre to the outside thereof, an inner structure 9, tensile armour layers 4 and an outer sheath 5. The inner structure can be of any type, and it can notably comprise at least one of the layers illustrated in FIG. 1 (carcass, pressure sheath, pressure vault, etc.). Tensile armour layers 4 comprise two metallic armour layers 6 and two composite armour layers 7. The two metallic armour layers 6 are arranged with opposite lay angles. Similarly, the two composite armour layers 7 are arranged with opposite lay angles. Metallic armours 6 have a substantially rectangular section. Composite armours 7 have a substantially circular section. Besides, armour layers 4 comprise separation means 8. According to the embodiment illustrated, separation means 8 consist of strips of substantially rectangular section. For this embodiment, the strips of separation means 8 are arranged between the composite tensile armours 7. In other words, composite tensile armour layer 7 is made up of an alternation of composite tensile armours 7 and separation means 8. The height of the section of separation means 8 is greater than the height of composite tensile armours 7, so as to maintain a radial clearance. Furthermore, the thickness of separation means 8 is less than the circumferential distance between two consecutive composite tensile armours 7.

Figure 3:
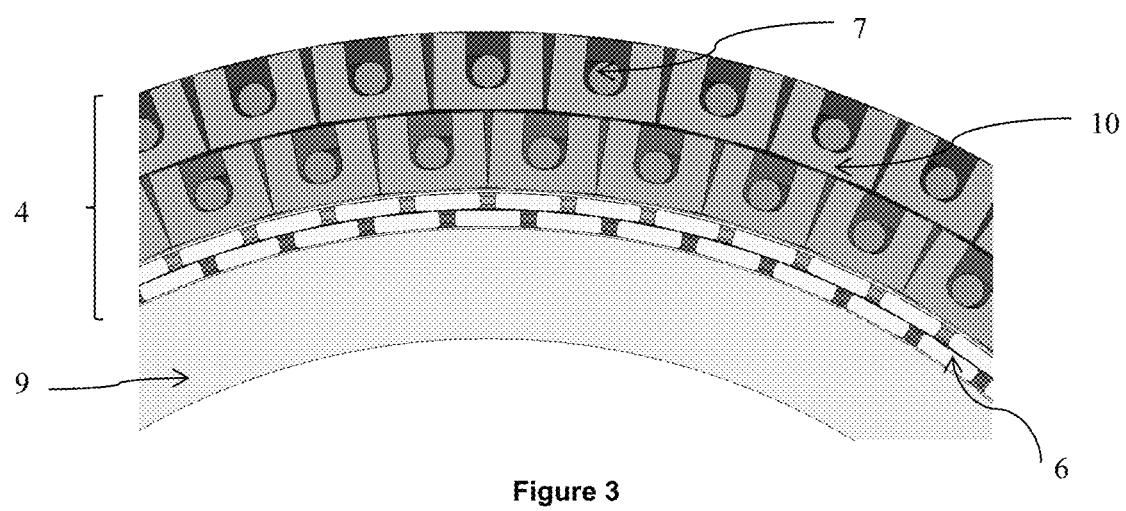
FIG. 3 illustrates a flexible pipe according to a second embodiment of the invention.

FIG. 3 schematically shows, by way of non-limitative example, a flexible pipe according to the second embodiment of the invention. FIG. 3 is a partial cross-sectional view of a flexible pipe. The flexible pipe comprises, from the centre to the outside thereof, an inner structure 9, tensile armour layers 4 and an outer sheath (not shown). The inner structure can be of any type, and it can notably comprise at least one of the layers illustrated in FIG. 1 (carcass, pressure sheath, pressure vault, etc.). Tensile armour layers 4 comprise two metallic armour layers 6 and two composite armour layers 7. The two metallic armour layers 6 are arranged with opposite lay angles. Similarly, the two composite armour layers 7 are arranged with opposite lay angles. Metallic armours 6 have a substantially rectangular section. Composite armours 7 have a substantially circular section. Besides, armour layers 4 comprise separation means 10. According to the embodiment illustrated, separation means 10 consist of strips of substantially U-shaped section, the U being open towards the outside of the flexible pipe. For this embodiment, the strips of separation means 10 are wound around metallic tensile armour layer 6, and a composite tensile armour 7 is arranged within each U of separation means 10. In other words, composite tensile armour layer 7 consists of a series of U-shaped separation means 10 within which composite tensile armours 7 are arranged. The height of the branches of the U of separation means 10 provides the radial clearance, and the space between the branches of the U of separation means 10 provides the circumferential clearance.

The present invention is suited for riser type flexible pipes and for flowline type flexible pipes.

The invention is particularly well suited for a flexible pipe used at great depth, for which the pipe top tension is the most severe loading for dimensioning the armours.

Application Example

The features and advantages of the flexible pipe according to the invention will be clear from reading the application example hereafter.

This application example relates to a flowline type flexible pipe used at a water depth of 2500 m whose dimensioning load for the armours is the tension at the top of the installation, with an extreme loading at the installation top of 4300 kN, corresponding to the own weight weighted by a coefficient 1.25. For the current solution (according to the prior art), the mechanical reinforcement element consists of:

two carbon steel armour layers of high mechanical strength, greater than or equal to 1200 MPa, with respectively 64 and 66 wires of section 14×6 mm$^2$ and a lay angle of 25 degrees.

Thanks to the design of the flexible pipe according to the invention, it is possible to dimension the steel section for bottom loadings only, i.e. external pressure and buckling. For the same extreme loading defined above, a flexible pipe according to the invention can be dimensioned with a mechanical reinforcement element consisting of:

two carbon steel armour layers of high mechanical strength, greater than or equal to 1200 MPa, with respectively 64 and 66 wires of section 12×3 mm$^2$ and a lay angle of 25 degrees.

two composite armour layers with respectively 50 and 52 6-mm diameter wires spaced out with an identical number of separation means, of section 11×9.6 mm$^2$ and a lay angle of 15 degrees; in addition:

the composite armours are made of a composite material with 60% carbon fibres (of Toray T700 type) in an epoxide resin, the separation means are made of polypropylene PP (ELTEX® TUB350 by Solvay Plastics).

This design is achieved according to the embodiment of FIG. 2, with separation means having a substantially rectangular section, and with two metallic armour layers and two composite armour layers. Between the two designs (current solution and solution according to the invention), the other characteristics of the flexible pipe (for example materials, designs, dimensions of the sheaths, the carcass, the pressure vault, etc.) are not modified.

Calculation of the axial stiffnesses of the layers shows a distribution of the axial loads of 70% in the steel armours and 30% in the composite armours.

The weight gain is 52 kg/m in air and 45 kg/m in water with a full pipe. The weight gain is possible because the section of the steel armour layers is divided by two in relation to the current solution of the prior art.

Thus, the design of the armour layers of a flexible pipe according to the invention allows a significant reduction in the mass of the flexible pipe while maintaining flexibility and mechanical strength to the inside and outside pressure loadings. The flexibility being maintained, it is possible to wrap the flexible pipe around a storage reel with a winding radius similar to that of a conventional flexible pipe without composite armour layers.

The invention claimed is:

1. A flexible pipe for petroleum fluid transport, the pipe comprising at least one mechanical reinforcement element and a pressure sheath, the mechanical reinforcement element being arranged outside the pressure sheath, the mechanical reinforcement element comprising at least one metallic tensile armour layer and at least one composite tensile armour layer, the composite tensile armour layer being arranged outside the metallic tensile armour layer, wherein separation means separate the composite tensile armours, the separation means providing a radial clearance and a circumferential clearance for the composite tensile armours.

2. A pipe as claimed in claim 1, wherein the radial clearance $J_r$ of the composite tensile armours is determined as a function of an equation of the type:

$$J_r \geq a_c \cdot \left( \sqrt{1 - \frac{1 - \left(1 + \frac{\Delta L}{L_0}\right)^2}{\tan^2 \alpha_c}} - 1 \right),$$

with $a_c$ the mean radius of the composite tensile armour (7), $$\frac{\Delta L}{L_0}$$

the contraction ratio of the pipe under the load of the external pressure, and $\alpha_c$ the armouring lay angle of the composite tensile armours.

3. A pipe as claimed in claim 1, wherein the lay angle of the composite tensile armour layer is less than or equal to 25 degrees, preferably ranging between 10 and 25 degrees.

4. A pipe as claimed in claim 1, wherein the lay angle of the metallic tensile armour layer ranges between 25 and 55 degrees, preferably between 30 and 55 degrees.

5. A pipe as claimed in claim 1, wherein the composite tensile armours are dimensioned for sharing the axial loads among the metallic and composite armour layers.

6. A pipe as claimed in claim 1, wherein the number of composite tensile armours making up the composite tensile armour layer is constrained by the section, the lay angle and the material of the composite tensile armours, and by the number, the section, the lay angle and the material of the metallic tensile armours.

7. A pipe as claimed in claim 1, wherein the number $n_c$ of composite tensile armours making up the composite tensile armour layer is defined by a formula of the type:

$$n_c > \frac{1}{S_c} \cdot \frac{1}{E_c \cdot \cos^3 \alpha_c} \cdot \max$$

$$\left\{ F_{TOT} \cdot \frac{E_a \cos^2 \alpha_a}{sf_a \cdot \sigma_a^Y} - K_a; F_{TOT} \cdot \frac{E_c \cdot \cos^2 \alpha_c}{sf_c \cdot \sigma_c^Y - E_c \cdot \frac{h_c}{a_c} \sin^2 \alpha_c} - K_a \right\},$$

with $K_i = E_i \cdot n_i \cdot S_i \cdot \cos^3 \alpha_i$, i being the subscript associated with the tensile armour layer considered: i corresponding to a for metallic or c for composite, $E_i$ the Young's modulus of material i, $S_i$ the section of the tensile armour of material i, $\alpha_i$ the armouring lay angle of the tensile armour of material i, $F_{TOT}$ the total axial force undergone by the pipe, $sf_i$ a safety factor for the tensile armour layer of material i, $\sigma_i^Y$ the tensile strength of material i, $h_c$ the maximum distance to the neutral axis of the composite tensile armour, and $a_c$ the mean positioning radius of the composite tensile armour.

8. A pipe as claimed in claim 1, wherein the composite material is designed to impart to the composite tensile armour layers an ultimate elongation at least equal to the ultimate elongation of the metallic tensile armour layers.

9. A pipe as claimed in claim 1, wherein the composite material is a unidirectional fibre composite material.

10. A pipe as claimed in claim 1, wherein the longitudinal Young's modulus of the composite material is less than the longitudinal Young's modulus of the metallic material.

11. A pipe as claimed in claim 1, wherein the circumferential clearance between a composite tensile armour and a separation means ranges between 0.5 and 3 mm.

12. A pipe as claimed in claim 1, wherein the separation means are made of a polymer material.

13. A pipe as claimed in claim 1, wherein the separation means consist of strips of substantially rectangular section, the strips of the separation means being arranged between the composite tensile armours.

14. A pipe as claimed in claim 1, wherein the separation means consist of strips of substantially U-shaped section, the strips of the separation means being wound around the metallic tensile armour layer, and a composite tensile armour being arranged within the U of each separation means.

15. A pipe as claimed in claim 1, wherein the composite tensile armours have a substantially circular section.

16. A pipe as claimed in claim 1, wherein the metallic tensile armours have a substantially rectangular section.

17. A pipe as claimed in claim 1, wherein the mechanical reinforcement element comprises an even number of metallic armour layers and an even number of composite armour layers.

* * * * *